United States Patent [19]

Fisch

[11] 4,035,181

[45] July 12, 1977

[54] PROTECTION OF SILVER REDUCTION MATERIALS

[75] Inventor: Richard S. Fisch, St. Paul, Minn.

[73] Assignee: Minnesota Mining and Manufacturing Company, St. Paul, Minn.

[21] Appl. No.: 721,533

[22] Filed: Sept. 8, 1976

[51] Int. Cl.² .................................. C22B 11/04
[52] U.S. Cl. ........................... 75/109; 75/.5 A; 75/118 R; 75/118 P
[58] Field of Search ............ 75/109, 118 R, 118 P, 75/.5 A, 108

[56] References Cited

U.S. PATENT DOCUMENTS

| | | | |
|---|---|---|---|
| 2,214,765 | 9/1940 | Holzwarth | 75/118 P X |
| 2,221,163 | 11/1940 | Barnes et al. | 75/118 P X |
| 2,863,761 | 12/1958 | Ashley et al. | 75/108 |
| 3,369,886 | 2/1968 | Metzger et al. | 75/.5 A |
| 3,390,981 | 7/1968 | Hoffman | 75/108 |
| 3,490,898 | 1/1970 | Venkatakrishnan | 75/98 |
| 3,666,447 | 5/1972 | Sanbestre | 75/108 |
| 3,820,979 | 6/1974 | Manassen | 75/108 |
| 3,961,943 | 6/1976 | Schell | 75/.5 A X |

*Primary Examiner*—G. Ozaki
*Attorney, Agent, or Firm*—Cruzan Alexander; Donald M. Sell; Mark A. Litman

[57] ABSTRACT

Materials have been found which retard the dissolution of steel wool during reduction of silver-rich solutions to reclaim silver therein. These materials include certain amines, ammonium salts, phosphates and ethylene oxides.

3 Claims, No Drawings

PROTECTION OF SILVER REDUCTION MATERIALS

BACKGROUND OF THE INVENTION

During processing of silver halide photographic materials, silver is often carried out of the photographic elements and into solutions, particularly the fix and bleach/fix solutions. As silver has more than a modest intrinsic value, many methods have been devised for desilvering these solutions to regain the metallic silver. Amongst the many available methods for reducing the silver in solution are electrolysis, contact reduction with a metal and chemical reduction. Each of these methods has its own advantages and disadvantages.

Electrolysis produces high purity silver because it reduces ionic silver by merely supplying electrons to the ions in solution. It requires a large initial capital expenditure and therefore reduces the profitability of silver recovery. Electrolysis is also ineffective at low concentrations of silver.

Chemical reduction and precipitation also can produce high purity silver, but the cost of the most effective reducing agents can be significant. The particle size of the reduced silver also can be quite small leading to difficulties in recovering the silver.

Metal contact reduction is an inexpensive means of reducing silver, but produces a low purity silver because of comingling with residual iron used in the oxidation/reduction process.

This metal displacement type of silver recovery process has traditionally been performed by passing silver rich solutions over iron, usually in the form of steel wool wherein an electron exchange occurs between the more and less noble metal. Iron is put into solution and the silver is allowed to settle out. The iron metal $Fe^°$ is oxidized to ferrous or ferric ion and the silver ion $Ag^+$ is reduced to silver metal. Some of the iron taken into solution is subsequently co-precipitated (by reduction) with the silver, which adulterates the purity of reclaimed noble metal. Because the iron or steel wool sits in a water based solution during this process and in a continuous wet condition during automatic machine processing, it is subject to attack due to oxidation or hydrogen ion effects.

When the stoichiometric balances between iron taken into solution and the amount of silver reduced were evaluated, it was found that in long term processsing where the silver rich solutions from automatic or manual film processors were not passed over the metal continuously (as with an overnight shut down), much more iron was being brought into solution than would be expected from the metal displacement silver recovery reaction, or even considering the normal oxidation of iron in an aqueous environment.

It has been found in the practice of the present invention that certain materials may be added to the steel wool in metal contact silver recovery processes which reduce the amount of iron brought into solution.

It has been found that the addition of certain materials to solutions and steel wool used in metal displacement silver recovery systems are especially effective in reducing the amount of iron which passes into solution during dormant periods of such processes.

Contact reduction (metal displacement) silver recovery has been described in prior art such as U.S. Pat. Nos. 3,630,505 and 3,369,801. Other techniques suggest the addition of certain materials to silver rich solutions which reduce the iron loss during active use of the contact reduction process by acting as reducing agents themselves and therefore changing the amount of iron necessary to reduce a given amount of silver. In a bleach fix bath, this last process is believed to work by converting $NaFe^{(III)}EDTA$ to $Na_2Fe^{(II)}EDTA$ and thereby eliminating the non-silver productive oxidative action of the first complex on steel wool and also the dissolving action of that complex on silver already deposited. This reduction of the complexed iron is effected by the addition of the chemical reducing agent.

SUMMARY OF THE INVENTION

In the practice of the present invention, it has been found that the addition of certain materials to silver-rich solutions or to steel wool which is used to desilver such solutions reduces hydrogen ion attack on the iron and reduces the non-productive amounts of iron being brought into the solution. These materials are selected from the classes of substituted quaternary ammonium chlorides, amines, phosphates and polyethylene oxides which additionally have passed a particular test. The materials must be capable of maintaining a stable condition (from separation) as a dispersion or solution in water for at least ten minutes at ambient temperature without agitation, and when added in an amount of 10 g/l with steel wool to a 1M thiosulfate solution (e.g., $Na^+$ or $NH_4^+$), the solution will not become black and turbid within 30 minutes. Materials selected from the below listed classes of compounds will function as described for the practice of this invention. More particularly, the present invention relates to materials of the following classes:

1. ethylene oxides having no acid free hydrogens,
2. non-aromatic hydrocarbon substituted quaternary ammonium chlorides having no acid free hydrogens,
3. phosphates having no acid free hydrogens, and
4. primary and secondary, alkylene, alkyl and alkanol amines having no acid free hydrogens.

The limitation on the absence of acid free hydrogens means that conventional acid groups (e.g., carboxylic acids) and acid salts (e.g., betaine HCl cannot be the protective compound since they will directly accelerate hydrogen embrittlement and corrosion by their acid nature. Both organic and inorganic phosphates may be used.

The metal contact reduction element used in the practice of this invention would have a container with an inlet and outlet means for liquids and steel wool within the container in physical contact with the above described additives. This contact may be provided by coating the materials onto the surface of the steel wool or by providing the additives in the silver rich liquids.

Practice of the present invention will be best understood after a reading of the Examples.

EXAMPLES 1–19

A standard fixing solution was prepared for use in the practice of the present invention comprising 475.0 g sodium thiosulfate, 67.5 g potassium metabisulfite and water to 1.0 liters.

For purposes of comparison with later examples 10 ml of this solution with seven (7) grams/liter silver as the silver thiosulfate complex was placed in a test tube. To this was added 5 grams of uncompressed steel wool. The color of the steel wool passed from gray to white to dark gray and then to black. The clear fix solution turned dark (blackish). Overnight the solution turned red-brown and the steel wool disintegrated.

To evaluate materials for the practice of this invention, 15% by weight aqueous solutions (or dispersions if the material is only dispersible) were prepared with each of the following materials:

2. Hydroquinone diacetate, an antioxidant
3. Formaldehyde, an antioxidant
4. Oligomeric fluorocarbon surfactants having polyoxyethylene oxide end-capping groups
5. Polyoxyethylene glycol (MW 200)
6. Polyoxyethylene glycol (MW 6000)
7. A water soluble copolymer (50/50) of styrene and maleic anhydride (a known corrosion protector)
8. Polyvinyl pyrrolidone (a known corrosion protector)
9. Arquad 1650, cetyl trimethyl quaternary ammonium chloride
10. Tetraethyl ammonium chloride
11. Ammonium chloride

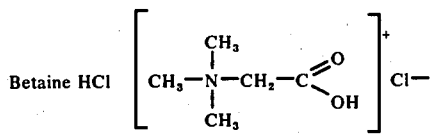

Betaine HCl

13. Hexadecyltrimethyl ammonium bromide
14. Ethoquad 0/12, an oleyl quaternary ammonium chloride with a backbone of 12 repeating units of ethylene oxide (i.e., polyethylene oxide)
15. Ethylene oxide phosphate
16. Hexadecyltrimethyl ammonium bromide
17. Tetraammonium bromide
18. Trimethylphenyl ammonium chloride
19. Benzyl dimethylphenyl ammonium chloride Five grams of steel wool were placed in these solutions for 10 minutes then dried in a vacuum oven. After drying and cooling, these samples of steel wool were immersed in individual 4 oz. bottles of fixer solution (80 ml) containing 7 g/l of silver complex. The fixer solutions turned dark-turbid within 30 minutes in Examples 2, 3, 7, 8, 11, 12, 13, and 16-20. The solutions in the other bottles remained clear, some for as long as 4 days, with the steel wool turning shiny and silvery.

A summary of the results shows that ethylene oxide compounds which do not contain free hydrogen groups, monomeric and polymeric, work well in the practice of the present invention. Hydrocarbon substituted ammonium chloride salts, which are not aromatically substituted and do not contain free hydrogen groups also work well.

Other materials have been suggested in the prior art to reduce corrosion of the metal wool by converting NaFe$^{(III)}$EDTA to Na$_2$Fe$^{(III)}$EDTA and thereby eliminating the non-silver producing oxidative action of the first material on steel wool. The present materials act to directly inhibit corrosion and hydrogen embrittlement and do not convert the NaFe$^{(III)}$EDTA. To protect the steel wool, the materials of the present invention need only be in an aqueous solution in contact with the steel wool during treatment of the fix or bleach/fix solutions, preferably by having been coated on the steel wool prior to contact with the silver-rich solutions.

EXAMPLE 20

This example shows the effect of practicing the present invention on an active silver recovery unit. Two miniature iron reduction cells were used. Each cell was essentially a plastic container having a 62 cm diameter and 53 cm depth. 27.5 g of continuous length steel wool was wrapped about hollow, stiff cores and packed into each cartridge. The steel wool in one cartridge was coated with an aqueous unused fixer solution containing 2.75 g polyoxyethylene glycol (MW 2000), the other with an identical unused fixer solution without the polyoxyethylene glycol. Both containers were allowed to stand for one hour.

Two separate pumps from the same source of used (silver laden) fixer solution (identical to that used in Examples 1–19) were then connected by pipes to the individual cartridges. The used (silver laden) fixer solution was then continuously pumped into the cartridges so that it flowed through the steel wool. Samples of the effluent liquid were then taken periodically for comparison with the used fixer solution prior to contact with the cartridge. When the pAg of the effluent from one of the containers was the same as the pAg of the used fixer solution, the pump to that container was shut off because the metal was used up and no more silver was being reduced. The results are as follows:

| Cell | Time (Hrs) | Ag Recovered (g) |
|---|---|---|
| w/o PEO | 17.0 | 15.9 |
| w PEO | 26.0 | 23.6 |

It can readily be seen that the same amount of steel wool was used for 50% more time in operation to recover 50% more silver. Although the present invention does not recover more silver from a given solution, it does use less steel wool in recovering the same amount of silver. This allows a more economical use of available steel. It also enables more silver laden solution to go through the same size steel wool container without the inconvenience of changing the container as frequently as presently required.

What is claimed is:

1. In the process of reducing silver ions from a silver rich solution by contacting said silver rich solution with iron, the improvement which comprises adding a water soluble material to said solution, which material acts to inhibit corrosion of said iron, said material comprising at least one selected from the group consisting of:
   1. ethylene oxides having no acid free hydrogens,
   2. non-aromatic hydrocarbon substituted quaternary ammonium chlorides having no acid free hydrogens,
   3. phosphates having no acid free hydrogens, and
   4. primary and secondary, alkylene, alkyl and alkanol amines having no acid free hydrogens which material is further characterized by
   1. being able to form a solution or dispersion in water which is stable from separation for 10 minutes, and
   2. when added in a concentration of 10 g/l with steel wool to a 1M sodium or ammonium thiosulfate solution will not allow the solution to turn dark and turbid within 30 minutes, said material being present in a 1:1 ratio with said steel wool.

2. The process of claim 1 wherein said ethylene oxide is a polyoxyethylene glycol.

3. The process of claim 1 wherein said quaternary ammonium chloride is a tetraalkyl ammonium chloride.

* * * * *